(12) United States Patent
Carlson et al.

(10) Patent No.: US 6,306,545 B1
(45) Date of Patent: *Oct. 23, 2001

(54) SEPARATORS FOR ELECTROCHEMICAL CELLS

(75) Inventors: Steven A. Carlson, Cambridge, MA (US); Qicong Ying, Tucson, AZ (US); Zhongyi Deng, Tucson, AZ (US); Terje A. Skotheim, Tucson, AZ (US)

(73) Assignee: Moltech Corporation, Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/215,112

(22) Filed: Dec. 17, 1998

Related U.S. Application Data

(63) Continuation-in-part of application No. 08/995,089, filed on Dec. 19, 1997, now Pat. No. 6,153,337.

(51) Int. Cl.$^7$ ............................ H01M 2/16; C04B 35/10
(52) U.S. Cl. ...................... 429/247; 429/251; 501/153
(58) Field of Search .................... 429/247, 251; 501/153

(56) References Cited

U.S. PATENT DOCUMENTS

| | | |
|---|---|---|
| 3,647,554 | 3/1972 | Arrance et al. . |
| 4,361,620 | 11/1982 | Newton . |
| 4,664,991 | 5/1987 | Perichaud et al. . |
| 5,178,849 | 1/1993 | Bauer . |
| 5,194,341 | 3/1993 | Bagley et al. . |
| 5,312,789 * | 5/1994 | Wood ................. 501/153 X |
| 5,326,391 | 7/1994 | Anderson et al. ......... 428/317.9 |
| 5,418,091 | 5/1995 | Gozdz et al. ............. 429/252 |
| 5,529,860 | 6/1996 | Skotheim et al. ......... 429/213 |
| 5,538,812 | 7/1996 | Lee et al. . |
| 5,549,989 | 8/1996 | Anani . |
| 5,597,659 | 1/1997 | Morigaki et al. . |
| 5,601,947 | 2/1997 | Skotheim et al. ......... 429/213 |
| 5,605,750 | 2/1997 | Romano et al. ......... 428/304.4 |
| 5,690,702 | 11/1997 | Skotheim et al. ......... 29/623.1 |
| 5,691,005 | 11/1997 | Morigaki et al. ......... 427/508 |
| 5,782,940 | 7/1998 | Jayan et al. . |
| 5,824,434 | 10/1998 | Kawakami et al. ......... 429/209 |
| 5,882,721 | 3/1999 | Delnick ............... 427/77 |

FOREIGN PATENT DOCUMENTS

| | | |
|---|---|---|
| 0 144 097 | 6/1985 | (EP) . |
| 250518 B1 | 11/1991 | (EP) . |
| 0 523 840 | 1/1993 | (EP) . |
| 0 524 626 | 1/1993 | (EP) . |
| 600718 A2 | 6/1994 | (EP) . |
| 814520 A2 | 12/1997 | (EP) . |
| 875950 A2 | 11/1999 | (EP) . |
| WO 91/02385 | 2/1991 | (WO) . |
| WO 91/03080 A1 | 3/1991 | (WO) . |

OTHER PUBLICATIONS

Chemical Abstracts, Columbus, OH, U.S., Abstract No. 114:167903, "High–energy sodium–sulfur battery" corresponding to German Patent Publication No. DE 3,926,977 A1 (Month unknown) (1991).

Mori, Kazutaka. (Sep. 24, 1984), "Manufacturing porous diaphragm for gas separation," *Chemical Abstracts* 101, No.13, abstract No. 112848t.

Turkovic et al., (1995). "Measurements of the electrical properties of transparent gamma–A100H film" *Advances in Science and Technology, 3D Ceramics: Charting the Future*, pp. 2655–2662 (Month unknown).

Udagawa, Shigekazu. (Apr. 27, 1984), "Porous Diaphragm" *Patent Abstracts of Japan* 8, No.93 (C–220).

* cited by examiner

*Primary Examiner*—Stephen Kalafut
(74) *Attorney, Agent, or Firm*—Jacqueline M. Nicol; Steven A. Carlson

(57) ABSTRACT

This invention pertains to separators for electrochemical cells which comprise a microporous pseudo-boehmite layer; electrolyte elements comprising such separators; electrical current producing cells comprising such separators; and methods of making such separators, electrolyte elements and cells.

103 Claims, No Drawings

SEPARATORS FOR ELECTROCHEMICAL CELLS

This application is a continuation-in-part of U.S. patent application Ser. No. 08/995,089, filed Dec. 19, 1997, now U.S. Pat. No. 6,153,337 the contents of which are incorporated herein by reference in their entirety.

TECHNICAL FIELD

This invention is in the field of separators for electrochemical cells. More particularly, this invention pertains to separators for electrochemical cells which comprise a microporous pseudo-boehmite layer; electrolyte elements comprising such separators; electrical current producing cells comprising such separators; and methods of making such separators, electrolyte elements, and cells.

BACKGROUND

Throughout this application, various publications, patents, and published patent applications are referred to by an identifying citation. The disclosures of the publications, patents, and published patent specifications referenced in this application are hereby incorporated by reference into the present disclosure to more fully describe the state of the art to which this invention pertains.

An electroactive material that has been fabricated into a structure for use in a battery is referred to as an electrode. Of a pair of electrodes used in a battery, herein referred to as an electric current producing cell, the electrode on the electrochemically higher potential side is referred to as the positive electrode, or the cathode, while the electrode on the electrochemically lower potential side is referred to as the negative electrode, or the anode.

An electrochemically active material used in the cathode or positive electrode is referred to hereinafter as a cathode active material. An electrochemically active material used in the anode or negative electrode is hereinafter referred to as an anode active material. An electric current producing cell or battery comprising a cathode with the cathode active material in an oxidized state and an anode with the anode active material in a reduced state is referred to as being in a charged state. Accordingly, an electric current producing cell comprising a cathode with the cathode active material in a reduced state, and an anode with the anode active material in an oxidized state, is referred to as being in a discharged state.

Discharging an electric current producing cell in its charged state by allowing electrons to flow from the anode to the cathode through an external circuit results in the electrochemical reduction of the cathode active material at the cathode and the electrochemical oxidation of the anode active material at the anode. To prevent the undesirable flow of the electrons in a short circuit internally from the anode to the cathode, an electrolyte element is interposed between the cathode and the anode. This electrolyte element must be electronically non-conductive to prevent the short circuiting, but must permit the transport of positive ions between the anode and the cathode. The electrolyte element should also be stable electrochemically and chemically toward both the anode and the cathode.

Typically, the electrolyte element contains a porous material, referred to as a separator (since it separates or insulates the anode and the cathode from each other), and an aqueous or non-aqueous electrolyte, which typically comprises an ionic electrolyte salt and ionically conductive material, in the pores of the separator. A variety of materials have been used for the porous layer or separator of the electrolyte element in electric current producing cells. These porous separator materials include polyolefins such as polyethylenes and polypropylenes, glass fiber filter papers, and ceramic materials. Usually these separator materials are supplied as porous free standing films which are interleaved with the anodes and the cathodes in the fabrication of electric current producing cells. Alternatively, the porous separator layer can be applied directly to one of the electrodes, for example, as described in U.S. Pat. No. 5,194,341 to Bagley et al.

Porous separator materials have been fabricated by a variety of processes including, for example, stretching combined with special heating and cooling of plastic films, extraction of a soluble plasticizer or filler from plastic films, and plasma oxidation. The methods for making conventional free standing separators typically involve extrusion of melted polymeric materials either followed by a post-heating and stretching or drawing process or followed by a solvent extraction process to provide the porosity throughout the separator layer. U.S. Pat. No. 5,326,391 to Anderson et al. and references therein, describe the fabrication of free standing porous materials based on extraction of a soluble plasticizer from pigmented plastic films. U.S. Pat. No. 5,418,091 to Gozdz et al. and references therein, describe forming electrolyte layers by extracting a soluble plasticizer from a fluorinated polymer matrix either as a coated component of a multilayer battery structure or as an individual separator film. U.S. Pat. No. 5,194,341 to Bagley et al. describes an electrolyte element with a microporous silica layer and an organic electrolyte. The silica layer was the product of the plasma oxidation of a siloxane polymer. These manufacturing methods for free standing separators are complex and expensive and are not effective either in providing ultrafine pores of less than 1 micron in diameter or in providing separator thicknesses of less than 15 microns.

The methods for making a separator coated directly on another layer of the cell typically involve a solvent extraction process after coating to provide the porosity throughout the separator layer. As with the free standing separators, this solvent extraction process is complex, expensive, and not effective in providing ultrafine pores of less than 1 micron in diameter.

As the electrolyte in the pores of the separator in the electrolyte element, a liquid organic electrolyte containing organic solvents and ionic salts is typically used. Alternatively, a gel or solid polymer electrolyte containing an ionically conductive polymer and ionic salts, and optionally organic solvents, might be utilized instead of the liquid organic electrolyte. For example, U.S. Pat. Nos. 5,597,659 and 5,691,005 to Morigaki el al. describe a separator matrix formed of a microporous polyolefin membrane impregnated in its pores with an ionic conductive gel electrolyte.

In addition to being porous and chemically stable to the other materials of the electric current producing cell, the separator should be flexible, thin, economical in cost, and have good mechanical strength. These properties are particularly important when the cell is spirally wound or is folded to increase the surface area of the electrodes and thereby improve the capacity and high rate capability of the cell. Typically, free standing separators have been 25 microns ($\mu$m) or greater in thickness. As batteries have continued to evolve to higher volumetric capacities and smaller lightweight structures, there is a need for separators that are 15 microns or less in thickness with a substantial increase in the area of the separator in each battery. Reducing the thickness from 25 microns to 15 microns or less greatly increases the challenge of providing porosity and good mechanical strength while not sacrificing the protection against short circuits or not significantly increasing the total cost of the separator in each battery.

This protection against short circuits is particularly critical in the case of secondary or rechargeable batteries with lithium as the anode active material. During the charging process of the battery, dendrites can form on the surface of the lithium anode and can grow with continued charging. A key feature of the separator in the electrolyte element of lithium rechargeable batteries is that it have a small pore structure, such as 10 microns or less in pore diameter, and sufficient mechanical strength to prevent the lithium dendrites from contacting the cathode and causing a short circuit with perhaps a large increase in the temperature of the battery leading to an unsafe explosive condition.

Another highly desirable feature of the separator in the electrolyte element is that it is readily wetted by the electrolyte materials which provide the ionic conductivity. When the separator material is a polyolefinic material which has nonpolar surface properties, the electrolyte materials (which typically have highly polar properties) often poorly wet the separator material. This results in low capacities in the battery due to the nonuniform distribution of electrolyte materials in the electrolyte element.

Further it would be highly advantageous to be able to prepare free standing separators by a relatively simple process of coating which directly provides ultrafine pores as small as 1 nm in diameter and can readily provide a range of thicknesses from 50 microns or greater down to 1 micron. Also, it would be advantageous to be able to prepare separators with ultrafine pores and a wide range of thicknesses coated directly on another layer of the electric current producing cell by a process of coating without requiring any subsequent solvent extraction or other complex process which is costly, difficult to control, and not effective in providing ultrafine pores.

A separator, particularly one with a thickness less than 25 microns, which is applicable for electric current producing cells, and which can avoid the foregoing problems often encountered with the use of polyolefinic and other conventional porous materials made using extrusion, extraction, or other processes would be of great value to the battery industry.

SUMMARY OF THE INVENTION

The separator of the present invention for use in an electric current producing cell comprises a microporous pseudo-boehmite layer. In one embodiment, the pseudo-boehmite layer has a pore volume from 0.02 to 2.0 cm$^3$/g. In a preferred embodiment, the pseudo-boehmite layer has a pore volume from 0.3 to 1.0 cm$^3$/g. In a more preferred embodiment, the pseudo-boehmite layer has a pore volume from 0.4 to 0.7 cm$^3$/g.

In one embodiment, the pseudo-boehmite layer of the separator has an average pore diameter from 1 to 300 nm. In a preferred embodiment, the pseudo-boehmite layer has an average pore diameter from 2 to 30 nm. In a more preferred embodiment, the pseudo-boehmite layer has an average pore diameter from 3 to 10 nm.

In another embodiment of the invention, the pseudo-boehmite layer further comprises a binder. In one embodiment, the binder is present in the amount of 5 to 70% by weight of the pseudo-boehmite in the separator. In a preferred embodiment, the binder comprises polyvinyl alcohol, polyethylene oxide, polyvinyl pyrrolidone, copolymers of the foregoing, or a combination thereof. In another preferred embodiment, the pseudo-boehmite layer is impregnated with an ionic conductive polymer. In a most preferred embodiment, the ionic conductive polymer comprises a polymer resin cured with heat, ultraviolet light, visible light, infrared radiation, or electron beam radiation.

In one embodiment, the pseudo-boehmite layer of the separator has a thickness of from 1 micron to 50 microns. In a preferred embodiment, the pseudo-boehmite layer has a thickness of from 1 micron to 25 microns. In a more preferred embodiment, the pseudo-boehmite layer has a thickness of from 5 microns to 15 microns.

In another embodiment of the invention, a method for forming a separator for use in electric current producing cells is provided. The method comprises coating onto a substrate a liquid mixture comprising a boehmite sol and then drying the coating to form the microporous pseudo-boehmite layer, as described herein. In one embodiment, the liquid mixture comprising a boehmite sol further comprises a binder and then is dried to form the microporous pseudo-boehmite layer with binder present, as described herein. In a preferred embodiment, there is a subsequent step of delaminating the pseudo-boehmite layer from the substrate, thereby providing a free standing separator comprising the pseudo-boehmite layer with binder present. In a most preferred embodiment, the substrate comprises a cathode coating layer on at least one outermost surface and the liquid mixture comprising the boehmite sol is coated onto the cathode coating layer.

Another aspect of the separators and of the methods of forming the separator of this invention pertains to a method of making the separator comprising a microporous layer, which microporous layer comprises pseudo-boehmite and a binder, and to a separator formed by such method, wherein the method comprises the steps of: (a) coating onto a substrate a liquid mixture comprising a boehmite sol, a binder, and a liquid medium; and, (b) drying the coating formed in step (a) to yield the microporous layer. In one embodiment, the liquid medium comprises water. In one embodiment, the liquid medium comprises one or more organic solvents. In one embodiment, the liquid medium comprises one or more protic organic solvents selected from the group consisting of: alcohols and glycols. Suitable organic solvents for the liquid medium include, but are not limited to, methanol, ethanol, isopropanol, 1-propanol, 1-butanol, 2-butanol, ethylene glycol, propylene glycol, 2-methoxyethanol, 2-ethoxyethanol, and 2-butoxyethanol. In a preferred embodiment, the liquid medium comprises ethanol. In one embodiment, the liquid medium comprises water and one or more organic solvents.

A wide variety of binders that are compatible with the liquid mixture of the methods of this invention may be utilized in the present invention. In one embodiment, the binder is an organic binder. Suitable organic binders include, but are not limited to, polyvinyl alcohols, polyethylene oxides, alkylated polyethylene oxides, polyvinyl pyrrolidones, polyvinyl butyrals, cellulosics, polymers comprising quaternary ammonium groups, polyacrylamides and non-hydrolyzed derivatives and partially hydrolyzed derivatives, polyvinyl ethers, polyethyleneimines, polyurethanes, epoxies, melamine formaldehydes, urea formaldehydes; copolymers thereof; copolymers of maleic anhydride and derivatives and esters thereof; gelatin; starch; and mixtures of the foregoing binders. In one embodiment, the binder is an inorganic binder. Suitable inorganic binders include, but are not limited to, colloidal silicas, colloidal non-hydrated aluminum oxides, colloidal tin oxides, colloidal titanium oxides, colloidal zirconium oxides, and colloidal zinc oxides. In one embodiment, the binder further comprises one or more additives. Suitable additives include, but are not limited to, pigments, crosslinking agents, catalysts for non-radiation curing, sensitizers for radiation curing, plasticizers, surfactants, and dispersants. Since the densities of some binders, especially those comprising inorganic binders and pigments with high specific gravities, may be high, in one embodiment, the binder is present in an amount of 3 to 200% of the weight of the pseudo-boehmite in the microporous layer. In a preferred embodiment, the binder is present in an amount of 5 to 70% by weight of the pseudo-boehmite in the microporous layer. In one embodiment, the microporous layer has a thickness of from 1 micron to 50 microns, preferably from 1 micron to 25 microns, and, more preferably, from 2 to 15 microns.

In one embodiment of the methods of forming the separator of the present invention, at least one outermost surface of said substrate comprises a cathode layer and said liquid mixture is coated onto said cathode layer.

In one embodiment of the methods of forming the separator of the present invention, the substrate comprises a release layer on at least one outermost surface, and the liquid mixture is coated onto the release layer. In one embodiment, after step (b) of drying the coating to yield the microporous layer, there are subsequent steps of: (c) contacting a surface of the microporous layer with a coating solution comprising a solid material and a liquid medium; and, (d) drying the coating formed in step (c) to yield a coating layer comprising the solid material. In one embodiment, the coating layer in step (d) is a cathode layer. In one embodiment, there is a subsequent step of delaminating the microporous layer, as described herein, from the substrate comprising the release layer.

In one embodiment of the methods of forming the separator of the present invention, pores of said microporous layer are impregnated with a composition comprising a polymer, preferably the polymer is ionically conductive. In one embodiment of the methods of forming the separator of the present invention, after step (b) of drying the coating to yield the microporous layer, there are subsequent steps of: (c) contacting a surface of said microporous layer with a solution comprising heat- or radiation-curable monomers or oligomers, thereby causing infusion of said monomers or said oligomers into pores of said microporous layer; and, (d) curing said monomers or said oligomers with an energy source selected from the group consisting of: heat, ultraviolet light, visible light, infrared radiation, and electron beam radiation; thereby forming a polymer.

In another embodiment of the methods of forming the separator of this invention, there is a subsequent step of contacting the surface of the pseudo-boehmite layer with a solution comprising heat- or radiation-curable monomers or oligomers to thereby cause the infusion of the monomers or oligomers into the pores of the pseudo-boehmite layer and then curing the monomers or oligomers with heat, ultraviolet light, visible light, infrared radiation, or electron beam radiation to form a composition comprising a polymer, preferably an ionically conductive polymer. In one embodiment, the solution further comprises a crosslinking agent, thereby forming a composition further comprising the crosslinking agent. In one embodiment, after the infusion and curing of the heat- or radiation-curable monomers or oligomers, there is a subsequent step of delaminating the pseudo-boehmite layer from the substrate, thereby providing a free standing separator comprising the pseudo-boehmite layer with a polymer present, preferably an ionically conductive polymer, in the pores of the pseudo-boehmite layer.

In another embodiment of the invention, an electrolyte element for use in an electric current producing cell comprises the separator comprising a microporous pseudo-boehmite layer, as described herein, and an organic electrolyte contained within the pores of the microporous pseudo-boehmite layer. Suitable materials for use as the organic electrolyte include liquid electrolytes, gel polymer electrolytes, and solid polymer electrolytes.

In another embodiment of the invention, a method of making an electrolyte element for an electric current producing cell is provided. The method comprises the methods of forming the separator comprising a microporous pseudo-boehmite layer, as described herein, and then contacting the surface of the microporous pseudo-boehmite layer with an organic electrolyte thereby causing the infusion of the electrolyte into the pores of the microporous pseudo-boehmite layer. In one embodiment, the organic electrolyte comprises heat- or radiation-curable monomers or oligomers. In a preferred embodiment, there is a subsequent step of curing the heat- or radiation-curable monomers or oligomers of the organic electrolyte with heat, ultraviolet light, visible light, infrared radiation, or electron beam radiation to form a polymer, preferably an ionically conductive polymer. In a most preferred embodiment, at least an outermost surface of the substrate is a cathode coating layer, and the pseudo-boehmite layer is coated on the cathode layer.

Another aspect of the invention pertains to a method of making an electrolyte element for an electric current producing cell, wherein the electrolyte element comprises a microporous layer comprising pseudo-boehmite and a binder, wherein the method comprises the steps of: (a) coating onto a substrate a liquid mixture comprising a boehmite sol, a binder, and a liquid medium; (b) drying the coating formed in step (a) to yield said microporous layer; and, (c) contacting a surface of said microporous layer with an organic electrolyte, thereby causing infusion of said electrolyte into pores of said microporous layer.

In another embodiment of the invention, an electric current producing cell is provided. The cell is comprised of a cathode and an anode, and an electrolyte element interposed between the cathode and the anode, wherein the electrolyte element comprises the separator comprising a microporous pseudo-boehmite layer, as described herein, and an organic electrolyte contained within the pores of the microporous pseudo-boehmite layer. In one embodiment, the cell is a secondary battery. In one embodiment, the cell is a primary electric current producing cell. In a preferred embodiment, the anode active material of the cell is selected from the group consisting of: a lithium metal, lithium-aluminum alloys, lithium-tin alloys, lithium-intercalated carbons, and lithium-intercalated graphites.

Suitable cathode active materials for the electric current producing cells of this invention include, but are not limited to, transition metal chalcogenides, conductive polymers, and sulfur-containing materials. In a preferred embodiment, the cathode of the cell comprises a sulfur-containing material.

In one embodiment, the sulfur-containing material comprises elemental sulfur. In one embodiment, the sulfur-containing material comprises a sulfur-containing polymer, wherein the electroactive sulfur-containing polymer, in its oxidized state, comprises a covalent polysulfide moiety of the formula, —$S_m$—, wherein m is an integer equal to or greater than 3, preferably m is an integer from 3 to 10, most preferably m is an integer equal to or greater than 6, and particularly most preferably m is an integer equal to or greater than 8. In one embodiment, the sulfur-containing polymer has a polymer backbone chain comprising conjugated segments. In one embodiment, the sulfur-containing polymer has a polymer backbone chain and the polysulfide moiety, —$S_m$—, is covalently bonded by one or both of its terminal sulfur atoms on a side group to the polymer backbone chain. In one embodiment, the sulfur-containing polymer has a polymer backbone chain and the polysulfide moiety, —$S_m$—, is incorporated into the polymer backbone chain by covalent bonding of terminal sulfur atoms of the polysulfide moiety. In one embodiment the sulfur-containing polymer comprises greater than 75 weight percent of sulfur.

In one embodiment, the electroactive sulfur-containing material comprises a sulfur-containing polymer comprising an ionic polysulfide moiety selected from the group of consisting of: ionic —$S_m^-$ moieties and ionic $S_m^{2-}$ moieties, wherein m is an integer equal to or greater than 3, and preferably m is an integer equal to or greater than 8. In one embodiment, the sulfur-containing polymer comprising an ionic polysulfide moiety has a polymer backbone comprising conjugated segments. In one embodiment, the polysulfide moiety, —$S_m^-$, is covalently bonded by one of its terminal sulfur atoms on a side group to the polymer backbone chain. In one embodiment, the sulfur-containing polymer comprising an ionic polysulfide moiety comprises greater than 75 weight percent of sulfur.

In a preferred embodiment, the cathode of the secondary battery comprises an electroactive sulfur-containing cathode material, wherein the electroactive sulfur-containing cathode material, in its oxidized state, comprises a polysulfide moiety of the formula, —$S_m$—, wherein m is an integer equal to or greater than 3, preferably m is an integer from 3 to 10, and most preferably m is an integer equal to or greater than 6, and particularly most preferably m is an integer equal to or greater than 8. In a most preferred embodiment, the electroactive sulfur-containing cathode material is selected from the group consisting of: elemental sulfur; carbon-sulfur polymer materials with their —$S_m$— groups covalently bonded by one or more of their terminal sulfur atoms on a side group on the polymer backbone chain; carbon-sulfur polymer materials with their —$S_m$— groups incorporated into the polymer backbone chain by covalent bonding of their terminal sulfur atoms; and carbon-sulfur polymer materials with greater than 75 weight percent of sulfur in the carbon-sulfur polymer material. In one embodiment, the carbon-sulfur polymer materials comprise conjugated segments in the polymer backbone chain.

In another embodiment of the cell of this invention, the organic electrolyte in the electrolyte element comprises one or more materials selected from the group consisting of: liquid electrolytes, gel polymer electrolytes, or solid polymer electrolytes.

In another embodiment of the invention, a method for forming an electric current producing cell is provided. The method comprises providing an anode and a cathode, and enclosing an electrolyte element, as described herein, interposed between the anode and the cathode. In one embodiment of the method, the organic electrolyte of the electrolyte element comprises one or more materials selected from the group consisting of: liquid electrolytes, gel polymer electrolytes, and solid polymer electrolytes. In a preferred embodiment of the method, after the step of enclosing the electrolyte element between the anode and the cathode, there is a subsequent step comprising the imbibition of a solution comprising one or more ionic electrolyte salts and one or more electrolyte solvents into the electrolyte element. In a most preferred embodiment, after the step of enclosing the electrolyte element between the anode and the cathode, there is substantially no ionic electrolyte salt present in the electrolyte element, and there is a subsequent step comprising the imbibition of a solution comprising one or more ionic electrolyte salts and one or more electrolyte solvents into the electrolyte element.

As will be appreciated by one of skill in the art, features of one aspect or embodiment of the invention are also applicable to other aspects or embodiments of the invention.

DETAILED DESCRIPTION OF THE INVENTION

The separators of the present invention provide superior electric current producing cell properties, particularly in cells utilizing separators with thicknesses below about 25 microns. Conventional separators, such as porous polyolefins, porous fluoropolymers where the porosity is provided by a solvent extraction process, and glass fiber papers, and the like, are difficult and costly to manufacture, especially at thicknesses below about 25 microns. Due to the nature of the processes used to manufacture these separators and the relatively large pore sizes intrinsic to these separators, electrical shorting may be a significant challenge at separator thicknesses of below about 25 microns, especially at thicknesses below about 15 microns. To overcome these limitations, the separators of the present invention for use in electric current producing cells comprise a microporous pseudo-boehmite layer.

Separators Comprising Microporous Pseudo-Boehmite

Upon heating, $Al(OH)_3$ (which occurs naturally as gibbsite) transforms to a mixed oxide hydroxide, AlO•OH (which occurs naturally as diaspore and boehmite). Upon further heating above about 450° C., it further transforms to gamma-alumina, $Al_2O_3$. The term "pseudo-boehmite," as used herein, pertains to hydrated aluminum oxides having the chemical formula $Al_2O_3 \cdot xH_2O$ wherein x is in the range of from 1.0 to 1.5. Terms used herein, which are synonymous with "pseudo-boehmite," include "boehmite," "AlOOH," and "hydrated alumina." The materials referred to herein as "pseudo-boehmite" are distinct from anhydrous aluminas ($Al_2O_3$, such as alpha-alumina and gamma-alumina), and hydrated aluminum oxides of the formula $Al_2O_3 \cdot xH_2O$ wherein x is less than 1.0 or greater than 1.5.

The term "microporous," is used herein to describe the material of a layer, which material possesses pores of diameter of about 10 microns or less which are connected in a substantially continuous fashion from one outermost surface of the layer through to the other outermost surface of the layer. Porous separators which are made from fibers, such as glass, TEFLON (a trademark for polytetrafluoroethylene available from DuPont Corporation, Wilmington, Del.), and polypropylene, are generally characterized as non-woven separator materials and typically have pore diameters too large to be called microporous, thereby making them unacceptable for rechargeable cells where dendrite formation is a potential concern.

The amount of these pores in the layer may be characterized by the pore volume, which is the volume of pores per unit weight of the layer. The pore volume may be measured by filling the pores with a liquid having a known density and then calculated by the increase in weight of the layer with the liquid present divided by the known density of the liquid and then dividing this quotient by the weight of the layer with no liquid present, according to the equation:

$$\text{Pore Volume} = \frac{[W_1 - W_2]/d}{W_2} \quad \text{I}$$

where $W_1$ is the weight of the layer when the pores are completely filled with the liquid of known density, $W_2$ is the weight of the layer with no liquid present in the pores, and d is the density of the liquid used to fill the pores. Also, the pore volume may be estimated from the apparent density of the layer by subtracting the reciprocal of the theoretical density of the materials (assuming no pores) comprising the microporous layer from the reciprocal of the apparent density or measured density of the actual microporous layer, according to the equation:

$$\text{Pore Volume} = \left(\frac{1}{d_1} - \frac{1}{d_2}\right) \quad \text{II}$$

where $d_1$ is the density of the layer which is determined from the quotient of the weight of the layer and the layer volume as determined from the measurements of the dimensions of the layer, and $d_2$ is the calculated density of the materials in the layer assuming no pores are present or, in other words, $d_2$ is the density of the solid part of the layer as calculated from the densities and the relative amounts of the different materials in the layer. The porosity or void volume of the layer, expressed as percent by volume, can be determined according to the equation:

$$\text{Porosity} = \frac{100(\text{Pore Volume})}{[\text{Pore Volume} + 1/d_2]} \quad \text{III}$$

where pore volume is as determined above, and $d_2$ is the calculated density of the solid part of the layer, as described above.

In one embodiment, the pseudo-boehmite layer of the present invention has a pore volume from 0.02 to 2.0 cm$^3$/g. In a preferred embodiment, the pseudo-boehmite layer has a pore volume from 0.3 to 1.0 cm$^3$/g. In a more preferred embodiment, the pseudo-boehmite layer has a pore volume from 0.4 to 0.7 cm$^3$/g. Below a pore volume of 0.02 cm$^3$/g, the transport of ionic species is inhibited by the reduced pore volume. Above a pore volume of 2.0 cm$^3$/g, the amount of voids are greater which reduces the mechanical strength of the microporous pseudo-boehmite layer.

In contrast to conventional microporous separators which typically have pore diameters on the order of 1 to 10 microns, the separators of the present invention have pore diameters which range from about 1 micron down to less than 0.002 microns. In one embodiment, the separator of the present invention has an average pore diameter from 0.001 microns or 1 nm to 0.3 microns or 300 nm. In a preferred embodiment, the separator of the present invention has an average pore diameter from 2 nm to 30 nm. In a more preferred embodiment, the separator of the present invention has an average pore diameter from 3 nm to 10 nm.

The pore diameters of the separators of the present invention can be measured by preparing a sample of a cross-section of the layer by conventional techniques and viewing this cross-section through a microscope having the necessary resolution. For the ultrafine pore diameters of 2 to 30 nm, a transmission electron microscope (TEM) can provide the necessary resolution. The average pore diameter of the separators of the present invention may be determined by mercury porosimetry using conventional techniques.

One distinct advantage of separators with much smaller pore diameters on the order of 0.001 to 0.03 microns is that insoluble particles, even colloidal particles with diameters on the order of 0.05 to 1.0 microns, can not pass through the separator because of the ultrafine pores. In contrast, colloidal particles, such as the conductive carbon powders often incorporated into cathode compositions, can readily pass through conventional separators, such as microporous polyolefins, and thereby can migrate to undesired areas of the cell.

Another significant advantage of the pseudo-boehmite separators of the present invention over conventional separators is that the nanoporous structure of the layer may function as an ultrafiltration membrane and, in addition to blocking all particles and insoluble materials, may block the diffusion of soluble materials of relatively low molecular weights, such as 2,000 or higher, while permitting the diffusion of soluble materials with molecular weights below this cutoff level. This property may be utilized to advantage in selectively impregnating or imbibing materials into the separator during manufacture of the electric current producing cell or in selectively permitting diffusion of very low molecular weight materials through the separator during all phases of the operation of the cell while blocking or significantly inhibiting the diffusion of insoluble materials or of soluble materials of medium and higher molecular weights.

Another important advantage of the extremely small pore diameters of the separators of the present invention is the strong capillary action of these tiny pores which enhances the capability of the separators to readily take up or imbibe electrolyte liquids and to retain these materials in the pores.

The microporous pseudo-boehmite layer may optionally further comprise a binder, preferably an organic polymer binder. The binder is usually selected on the basis of improving the mechanical strength of the layer without significantly impacting the properties of the microporous structure, which includes transport of low molecular weight materials through the layer while blocking the transport of colloidal or larger particles and high molecular weight materials. The preferred amount of binder is from 5% to 70% of the weight of the pseudo-boehmite in the layer. Below 5 weight per cent, the amount of binder is usually too low to provide a significant increase in mechanical strength. Above 70 weight per cent, the amount of binder is usually too high and fills the pores to an excessive extent which may interfere with the transport of ionic species and other low molecular weight materials through the microporous layer.

Any binder that is compatible with the boehmite sol during mixing and processing into the microporous layer and provides the desired mechanical strength and uniformity of the layer without significantly interfering with the desired microporosity is suitable for use in this invention. Examples of suitable binders include, but are not limited to, polyvinyl alcohols, polyethylene oxides, polyvinyl pyrrolidones, copolymers thereof, and mixtures thereof. Preferred binders are water soluble polymers and have ionically conductive properties.

The microporous layer comprising pseudo-boehmite and binder may further comprise an ionic conductive polymer which is impregnated into the microporous layer. The term "ionic conductive polymer," as used herein, denotes a polymer which, when combined with an appropriate ionic electrolyte salt, may provide ionically conductive properties to a gel polymer electrolyte or a solid polymer electrolyte. The ionic conductive polymer may further increase mechanical strength, in addition to providing ionically conductive properties to the microporous layer. Since the microporous layer of the present invention typically blocks insoluble materials and soluble materials above a low molecular weight such as 2,000, the ionic conductive polymer is preferably formed by impregnating the microporous layer with suitable heat- or radiation-curable monomers or oligomers with molecular weights below 2,000 and then crosslinking these monomers or oligomers in situ to form an ionic conductive polymer resin by exposure to an energy source. Suitable energy sources include heat, ultraviolet light, visible light, infrared radiation, and electron beam radiation. Where the monomers or oligomers are not sensitive to the radiation (such as ultraviolet light), sensitizers may be added to the monomers or oligomers to activate the crosslinking or curing to form a polymer resin.

The thickness of the microporous pseudo-boehmite layer, with or without additional binder, for use as a separator may vary over a wide range since the basic properties of microporosity and mechanical integrity are present in layers of a few microns in thickness as well as in layers with thicknesses of hundreds of microns. For various reasons including cost, overall performance properties as a separator, and ease of manufacturing, the desirable thicknesses are in the range of 1 micron to 50 microns. Preferred are thicknesses in the range of 1 micron to 25 microns. More preferred are thicknesses in the range 2 to 15 Microns. The most preferred thicknesses are in the range of 5 microns to 15 microns. Conventional separators, such as the porous polyolefin materials, are typically 25 to 50 microns in thickness so it is particularly advantageous that the microporous separators of this invention can be effective and inexpensive at thicknesses well below 25 microns.

The present invention provides a method of forming a separator for use in electric current producing cells which overcomes the disadvantages of the aforementioned conventional methods for forming separators. One aspect of the method of the present invention comprises the steps of coating a liquid mixture comprising a boehmite sol onto a substrate and subsequently drying the coating to form a microporous pseudo-boehmite layer. This pseudo-boehmite layer has a pore volume from 0.02 to 2.0 $cm^3/g$ and has an average pore diameter from 1 nm to 300 nm, as described previously for the microporous pseudo-boehmite separator.

If increased mechanical strength or some other improvement in the properties of the separator are desired, the liquid mixture comprising the bochmite sol may further comprise a binder, and the resulting liquid mixture is then dried to form the microporous pseudo-boehmite layer with binder present.

One aspect of the separators and of the methods of forming the separator of this invention pertains to a method of making the separator comprising a microporous layer, which microporous layer comprises pseudo-boehmite and a binder, and to a separator formed by such method, wherein the method comprises the steps of: (a) coating onto a substrate a liquid mixture comprising a boehmite sol, a binder, and a liquid medium; and, (b) drying the coating formed in step (a) to yield the microporous layer. In one embodiment, the liquid medium comprises water. In one embodiment, the liquid medium comprises one or more organic solvents. In one embodiment, the liquid medium comprises one or more protic organic solvents selected from the group consisting of: alcohols and glycols. Suitable organic solvents for the liquid medium include, but are not limited to, methanol, ethanol, isopropanol, 1-propanol, 1-butanol, 2-butanol, ethylene glycol, propylene glycol, 2-methoxyethanol, 2-ethoxyethanol, and 2-butoxyethanol. In a preferred embodiment, the liquid medium comprises ethanol. In one embodiment, the liquid medium comprises water and one or more organic solvents. The use of organic solvents in the liquid medium may be advantageous in allowing a wider choice and amount of binders to be utilized with the boehmite sol, in providing a faster rate of drying, and in reducing the presence of water in the microporous layer, where the water may lead to undesirable reactions in the electric current producing cell.

A wide variety of binders that are compatible with the liquid mixture of the methods of this invention may be utilized in the present invention. In one embodiment, the binder is an organic binder. Suitable organic binders include, but are not limited to, polyvinyl alcohols, polyethylene oxides, alkylated polyethylene oxides such as the dimethyl ethers of polyethylene oxides, polyvinyl pyrrolidones, polyvinyl butyrals, cellulosics such as hydroxyethyl cellulose and alcohol-soluble cellulose acetate propionate, polymers comprising quaternary ammonium groups, polyacrylamides and non-hydrolyzed derivatives and partially hydrolyzed derivatives, polyvinyl ethers, polyethyleneimines, polyurethanes, epoxies, melamine formaldehydes, urea formaldehydes; copolymers thereof; copolymers of maleic anhydride and derivatives and esters thereof; gelatin; starch; and mixtures of the foregoing binders. In one embodiment, the binder is an inorganic binder. Suitable inorganic binders include, but are not limited to, colloidal silicas, colloidal non-hydrated aluminum oxides, colloidal tin oxides, colloidal titanium oxides, colloidal zirconium oxides, and colloidal zinc oxides. These colloidal oxide materials have the typical colloidal particle sizes of less than 1 micron and typically are present in the liquid mixture as colloidal sols which form inorganic gel networks with binder properties upon drying. In one embodiment, the binder further comprises one or more additives, as are known in the art of coatings with organic or inorganic binders. Suitable additives include, but are not limited to, pigments, crosslinking agents such as isocyanates, catalysts for non-radiation curing such as organic acids, sensitizers for radiation curing, plasticizers, surfactants, and dispersants.

Since the densities of some binders, such as, for example, those comprising inorganic binders and pigments with high specific gravities, may be high, in one embodiment, the binder is present in an amount of 3 to 200% of the weight of the pseudo-boehmite in the microporous layer. In a preferred embodiment, the binder is present in an amount of 5 to 70% by weight of the pseudo-boehmite in the microporous layer. In one embodiment, the microporous layer has a thickness of from 1 micron to 50 microns, preferably from 1 micron to 25 microns, and, more preferably, from 2 to 15 microns.

These methods of forming a microporous pseudo-boehmite layer with or without a binder present may be used to produce either a free standing separator or a separator coated directly onto a layer of an electric current producing cell. In a most preferred embodiment of the methods of forming the separators of this invention, the separator is coated directly onto the cathode layer of the electric current producing cell by application of a liquid mixture comprising a boehmite sol and a binder onto the outermost surface of a cathode coating layer on a suitable current collector substrate and then drying this liquid mixture to form the microporous pseudo-boehmite separator layer. The term "cathode coating layer" or "cathode layer," as used herein, refers to an outer most layer or surface of a cathode of an electric current producing cell. Typically, the outer most layer of the cathode is the cathode active layer. However, the cathode active layer may have another layer over it such that the cathode active layer is an intermediate layer in the cathode and not an outer most layer. The term "cathode active layer," as used herein, pertains to any layer of the cathode that comprises the cathode active material.

A further distinct advantage of this coating method to produce a separator is that it is flexible in the pattern in which the separator layer may be applied to the substrate. For example, the separator layer may be applied over the entire outermost surface of the cathode including the top surface and sides of the cathode coating on the current collector and cathode substrate. The cathode may thus be completely encapsulated on all outermost surfaces, including the edges or sides of the cathode coating which are not contacted or covered by conventional free standing polyolefin or other porous separators, by coating the separator layer in a pattern over all the outermost, exposed surfaces of the cathode. This complete encapsulation by the separator layer of the present invention is very advantageous to safety and battery performance in providing an insulating surface to prevent any short circuits by the cathode during fabrication and during use of the electric current producing cell. This encapsulation is also very advantageous to high cell capacity and long cycle life in acting as a total barrier in inhibiting the migration of any insoluble or high molecular weight species in the cathode to outside the cathode area and similarly in retarding the diffusion of any low molecular weight species, such as soluble polysulfides, in the cathode to outside the cathode area.

In a preferred embodiment, a free standing separator is formed by application of a liquid mixture comprising a boehmite sol and a binder onto a substrate, subsequently drying the liquid mixture to form the microporous pseudo-boehmite layer, and then delaminating this pseudo-boehmite layer from the substrate to provide a free standing microporous pseudo-boehmite separator with binder present. The substrate is selected to have weak adhesion to the pseudo-boehmite layer so that the coating can be readily delaminated from the substrate without damaging the separator. Suitable substrates include papers with release coatings on the surface that receives the pseudo-boehmite liquid mixture and flexible plastic films, such as polyester and polystyrene films, which have weak adhesion to the coating of boehmite sol and binder. The width of the separator layer when it is delaminated from the substrate may be the full width as coated on the substrate or the coated separator may be cut to a narrower width, such as the width desired for use in the specific electric current producing cell. In a most preferred embodiment, before delaminating the microporous pseudo-boehmite layer with binder present from the substrate, the surface of the pseudo-boehmite layer is contacted with heat- or radiation-curable monomers or oligomers, as described herein, to impregnate the pores of the pseudo-boehmite layer. After curing the monomers or oligomers with heat or radiation to form a polymer, the pseudo-boehmite layer is delaminated from the substrate to provide a free standing separator with polymer present, preferably an ionically conductive polymer.

In one embodiment of the methods of forming the separator of the present invention, the substrate comprises a release layer on at least one outermost surface, and the liquid mixture is coated onto the release layer. In one embodiment, after step (b) of drying the coating to yield the microporous layer, there are subsequent steps of: (c) contacting a surface of the microporous layer with a coating solution comprising a solid material and a liquid medium; and, (d) drying the coating formed in step (c) to yield a coating layer comprising the solid material. In one embodiment, the coating layer in step (d) is a cathode layer. In one embodiment, there is a subsequent step of delaminating the microporous layer, as described herein, from the substrate comprising the release layer.

In one embodiment of the methods of this invention for producing a separator coated directly on the cathode active layer, the surface of the pseudo-boehmite layer is contacted with a solution comprising heat- or radiation-curable monomers or oligomers, as described herein, to impregnate the pores of the pseudo-boehmite layer. Curing the monomers or oligomers with heat or radiation to form a composition comprising a polymer provides a microporous pseudo-boehmite separator with polymer, preferably an ionically conductive polymer, present coated directly on the cathode active layer. In one embodiment, the solution further comprises a crosslinking agent, thereby forming a composition further comprising the crosslinking agent. Suitable crosslinking agents include, but are not limited to, isocyanates and polyaziridines.

Electrolyte Elements

The present invention provides an electrolyte element for use in an electric current producing cell by combining the separator of the present invention, as described herein, with an electrolyte contained within the pores of the pseudo-boehmite layer of the separator. The electrolyte may be any of the types of non-aqueous and aqueous electrolytes known in the art.

The methods of making electrolyte elements for an electric current producing cell of the present invention comprise the steps of first coating a liquid mixture comprising a boehmite sol and a liquid medium, and optionally a binder, onto a substrate and then drying the coating to form a microporous pseudo-boehmite layer, as described herein in the methods of making a separator, and subsequently contacting a surface of this pseudo-boehmite layer with an electrolyte, preferably an organic electrolyte, to cause the electrolyte to infuse into the pores of the pseudo-boehmite layer. Prior to the infusion of the electrolyte, the pseudo-boehmite layer has a pore volume from 0.02 to 2.0 cm$^3$/g and an average pore diameter from 1 nm to 300 nm, as described herein for the microporous pseudo-boehmite separator.

If increased mechanical strength or some other improvements such as improved adhesion to the substrate or coating uniformity are desired, the liquid mixture comprising the boehmite sol may further comprise a binder and then is dried to form a microporous pseudo-boehmite layer with binder present. The types of the binders such as polyvinyl alcohols, the amounts of the binder materials in the range of 3 to 200% of the weight of the pseudo-boehmite in the layer, and the thicknesses of the pseudo-boehmite layer with binder in the range of 1 to 50 microns, preferably 1 to 25 microns, more preferably 2 to 15 microns, and most preferably 5 to 15 microns, are as described herein for the microporous pseudo-boehmite separator and the methods of making the microporous pseudo-boehmite separator.

Examples of suitable electrolytes for use in the electrolyte elements of the present invention include, but are not limited to, organic electrolytes comprising one or more materials selected from the group consisting of: liquid electrolytes, gel polymer electrolytes, and solid polymer electrolytes.

Examples of useful liquid electrolyte solvents include, but are not limited to, those comprising electrolyte solvents selected from the group consisting of: N-methyl acetamide, acetonitrile, carbonates, sulfones, sulfolanes, aliphatic ethers, cyclic ethers, glymes, siloxanes, dioxolanes, N-alkyl pyrrolidones, substituted forms of the foregoing, and blends thereof; to which is added an appropriate ionic electrolyte salt.

The electrolyte solvents of these liquid electrolytes are themselves useful as plasticizers for semi-solid or gel polymer electrolytes. Examples of useful gel polymer electrolytes include, but are not limited to, those comprising, in addition to the electrolyte solvents sufficient to provide the desired semi-solid or gel state, ionic conductive polymers selected from the group consisting of: polyethylene oxides (PEO), polypropylene oxides, polyacrylonitriles, polysiloxanes, polyimides, polyphosphazenes, polyethers, sulfonated polyimides, perfluorinated membranes (NAFION™ resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing; to which is added an appropriate ionic electrolyte salt.

Examples of useful solid polymer electrolytes include, but are not limited to, those comprising ionic conductive polymers selected from the group consisting of: polyethers, polyethylene oxides (PEO), polypropylene oxides, polyimides, polyphosphazenes, polyacrylonitriles (PAN), polysiloxanes, polyether grafted polysiloxanes, derivatives of the foregoing, copolymers of the foregoing, crosslinked and network structures of the foregoing, and blends of the foregoing; to which is added an appropriate ionic electrolyte salt. The solid polymer electrolytes suitable for use in this invention may optionally further comprise one or more electrolyte solvents, typically less than 20% by weight.

To improve the ionic conductivity and other electrochemical properties of the electrolyte element, the organic electrolyte typically comprises one or more ionic electrolyte salts. As used herein, liquid electrolytes, gel polymer electrolytes, and solid polymer electrolytes comprise an ionic electrolyte salt.

Examples of ionic electrolyte salts for use in the present invention include, but are not limited to, $MClO_4$, $MAsF_6$, $MSO_3CF_3$, $MSO_3CH_3$, $MBF_4$, $MB(Ph)_4$, $MPF_6$, $MSCN$, $MI$, $MBr$,

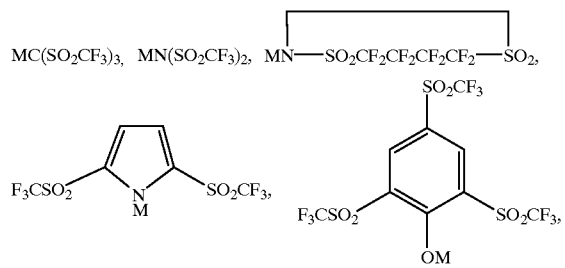

and the like, where M is Li or Na. Other electrolyte salts useful in the practice of this invention are lithium polysulfides, lithium salts of organic ionic polysulfides and those disclosed in U.S. Pat. No. 5,538,812 to Lee et al. Preferred ionic electrolyte salts are LiI, LiSCN, $LiSO_3CF_3$ (lithium triflate) and $LiN(SO_2CF_3)_2$ (lithium imide).

Since the microporous pseudo-boehmite layer of this invention is usually impermeable to high molecular weight materials such as the ionic conductive polymers typically used in gel polymer electrolytes and solid polymer electrolytes, it is preferable to introduce the ionic conductive polymer component of the electrolyte in a low molecular weight monomer or oligomer form into the pores of the pseudo-boehmite layer. Subsequently, the low molecular weight monomer or oligomer may be cured into an ionic conductive polymer to provide the desired type of polymer electrolyte. Suitable monomers or oligomers include, but are not limited to, heat- or radiation-curable monomers or oligomers. Examples include divinyl ethers such as tetra-ethyleneglycol divinyl ether. To provide sensitivity to ultraviolet (UV) or visible radiation where the monomers or oligomers do not absorb significantly, a conventional photosensitizer may be added to cause curing of the monomers or oligomers into a polymeric material. For example, a small amount, such as 0.2% by weight of the monomers or oligomers, of a UV sensitizer, such as ESCURE KTO (a trademark for a photosensitizer available from Sartomer Inc., Exton, Pa.), may be added to the monomers or oligomers.

The fraction of the pores of the pseudo-boehmite layer that are filled with ionic conductive polymer may vary from 2 to 100% depending on the type of polymer electrolyte desired. For gel polymer electrolytes, it is preferred to fill 15 to 80% of the pores with the ionic conductive polymer and then to fill the remainder of the pores with electrolyte solvents and ionic electrolyte salts. Typically, the ionic conductive polymer swells in the presence of the electrolyte solvents and ionic electrolyte salts to form a semi-solid or gel polymer electrolyte. A particular advantage of the ultrafine pores and strong capillary action of the pseudo-boehmite separator of the present invention is its excellent wetting by a broad variety of electrolytes and retention of these electrolytes in the pores. Accordingly, it is possible to incorporate liquid or tacky electrolyte materials into the nanoporous matrix of the pseudo-boehmite separator without having a significant excess of liquid or tacky material on the surface. Preferably, the electrolyte material is held below the outermost surface of the pseudo-boehmite separator during the cell fabrication process. For example, this is useful in preventing the tacky surfaces of solid or gel polymer electrolytes from interfering with the fabrication processes of winding or layering a multiple layer construction of an electric current producing cell. For liquid organic electrolytes, no polymer is required, and the electrolyte composition may consist of only electrolyte solvents and ionic electrolyte salts.

In a most preferred embodiment, the method of producing the electrolyte element comprises a substrate with a cathode coating layer on at least one of its outermost surfaces, and the liquid mixture comprising the boehmite sol is coated onto this cathode coating layer and, after drying, the surface of the pseudo-boehmite layer is contacted with an organic electrolyte to cause the infusion of the electrolyte into the pores of the pseudo-boehmite layer.

Electric Current Producing Cells

The present invention provides an electric current producing cell comprising a cathode and an anode and an electrolyte element interposed between the cathode and the anode, wherein the electrolyte element comprises a microporous pseudo-boehmite layer and an electrolyte, preferably an organic electrolyte, contained within the pores of the pseudo-boehmite layer, as described herein for the microporous pseudo-boehmite layer or separator and the electrolyte element of the present invention. This pseudo-boehmite layer has a pore volume from 0.02 to 2.0 $cm^3/g$, before the introduction of the electrolyte, and has an average pore diameter from 1 nm to 300 nm, as described herein for the microporous pseudo-boehmite separator.

Although the electric current producing cell of the present invention may be utilized for a wide variety of primary and secondary batteries known in the art, it is preferred to utilize these cells in secondary or rechargeable batteries where the many features of a free standing or directly coated microporous pseudo-boehmite separator may be employed to help control the chemistry of the active materials through many repeated discharge and charge cycles.

Suitable anode active materials for the electric current producing cells of the present invention include, but are not limited to, one or more metals or metal alloys or a mixture of one or more metals and one or more alloys, wherein said metals are selected from the Group IA and IIA metals in the Periodic Table. Examples of suitable anode active materials of the present invention include, but are not limited to, alkali-metal intercalated conductive polymers, such as lithium doped polyacetylenes, polyphenylenes, polypyrroles, and the like, and alkali-metal intercalated graphites and carbons. Anode active materials comprising lithium are especially useful. Preferred anode active materials are lithium metal, lithium-aluminum alloys, lithium-tin alloys, lithium-intercalated carbons, and lithium-intercalated graphites.

Suitable cathode active materials for use in the cathode active layers of the cathodes for the electric current producing cells of this invention include, but are not limited to, electroactive transition metal chalcogenides, electroactive conductive polymers, and electroactive sulfur-containing materials. The term "sulfur-containing material," as used herein, relates to cathode active materials which comprise the element sulfur in any form, wherein the electrochemical activity involves the breaking or forming of sulfur-sulfur covalent bonds. In one embodiment, the electroactive sulfur-containing material comprises elemental sulfur. In one embodiment, the electroactive sulfur-containing material is organic, that is, it comprises both sulfur atoms and carbon atoms. In one embodiment, the electroactive sulfur-containing material comprises a sulfur-containing polymer, wherein the electroactive sulfur-containing polymer, in its oxidized state, comprises a covalent polysulfide moiety of the formula, $-S_m-$, wherein m is an integer equal to or greater than 3, preferably m is an integer from 3 to 10, most preferably m is an integer equal to or greater than 6, and particularly most preferably m is an integer equal to or greater than 8.

Cathode active materials for use in the cathodes for the electric current producing cells of the present invention include, but are not limited to, electroactive sulfur-containing cathode materials which, in their oxidized state, comprise a polysulfide moiety of the formula, $-S_m-$, wherein m is an integer equal to or greater than 3, preferably m is an integer from 3 to 10, most preferably m is an integer equal to or greater than 6, and particularly most preferably m is an integer equal to or greater than 8. Examples of these preferred cathode materials include elemental sulfur and carbon-sulfur polymer materials, as described in U.S. Pat. Nos. 5,529,860; 5,601,947;and 5,690,702;in U.S. patent application Ser. No. 08/602,323, all by Skotheim et al.; and in U.S. patent application Ser. No. 08/995,112 to Gorkovenko et al., all to the common assignee.

In a most preferred embodiment, the polysulfide moiety, $-S_m-$, of the carbon-sulfur polymer material is covalently bonded by one or both of its terminal sulfur atoms on a side group to the polymer backbone chain of the polymer material. In another most preferred embodiment, the polysulfide moiety, $-S_m-$, of the carbon-sulfur polymer material is incorporated into the polymer backbone chain of the polymer material by covalent bonding of the polysulfide moiety's terminal sulfur atoms. In another most preferred embodiment, the carbon-sulfur polymer material with polysulfide, $-S_m-$, groups, wherein m is an integer equal to or greater than 3, comprises greater than 75 weight percent of sulfur.

In one embodiment, the electroactive sulfur-containing material comprises a sulfur-containing polymer comprising an ionic polysulfide moiety selected from the group consisting of: ionic $-S_m^-$ moieties and ionic $S_m^{2-}$ moieties, wherein m is an integer equal to or greater than 3, and preferably m is an integer equal to or greater than 8. Examples of these sulfur-containing materials include sulfur-containing polymers comprising ionic $-S_m^-$ moieties, as described in U.S. Pat. No. 4,664,991 to Perichaud et al, and sulfur-containing polymers comprising ionic $S_m^{2-}$ moieties, as described in the aforementioned U.S. Pat. No. 4,664,991 and in European Pat. No. 250,518 B1 to Genies. In one embodiment, the polymer backbone chain of the sulfur-containing polymer having an ionic polysulfide moiety comprises conjugated segments. In one embodiment, the polysulfide moiety, $-S_m^-$, is covalently bonded by one of its terminal sulfur atoms on a side group to the polymer backbone chain of the sulfur-containing polymer. In one embodiment, the sulfur-containing polymer having an ionic polysulfide moiety comprises greater than 75 weight percent of sulfur.

In another embodiment of the electric current producing cell of the present invention, the electrolyte of the electrolyte element is an organic electrolyte comprising one or more materials selected from the group consisting of: liquid electrolytes, gel polymer electrolytes and solid polymer electrolytes.

A method for forming the electric current producing cell of the present invention comprises providing an anode and a cathode and interposing an electrolyte element of the present invention, as described herein, between the anode and the cathode.

In one embodiment of the methods of forming the electric current producing cell, the electrolyte of the electrolyte element is an organic electrolyte comprising one or more materials selected from the group consisting of: liquid electrolytes, gel polymer electrolytes, and solid polymer electrolytes.

The flexibility of the product designs and methods of forming the separators and electrolyte elements of the present invention provide the option of effectively incorporating the ionic electrolyte salt into the electric current producing cell at a later or final stage of fabricating materials into the electrochemically active cell. This may be advantageous when the ionic electrolyte salt is hygroscopic and difficult to coat as part of a gel polymer or solid polymer electrolyte composition and then difficult to keep from absorbing water before fabrication and hermetic sealing of the cell in a dry room facility. This may also be advantageous when the ionic electrolyte salt increases the viscosity and otherwise interferes with the wetting and penetration of a liquid or polymer electrolyte into the separator and cathode layers during the filling of the cell. In a preferred embodiment, after the electrolyte element is enclosed between the anode and cathode, there is a subsequent step comprising the imbibition of a solution comprising one or more ionic electrolyte salts and one or more electrolyte solvents into the electrolyte element. In a most preferred embodiment, the electrolyte element that is enclosed between the anode and the cathode initially comprises the microporous layer and electrolyte solvents, but contains no ionic electrolyte salt; and the ionic electrolyte salts as may be required for the electrolyte element are provided by a subsequent step of imbibing a solution comprising one or more ionic electrolyte salts and one or more electrolyte solvents into the electrolyte element. To achieve the desired final concentration of ionic electrolyte salts in the organic electrolyte, the concentration of ionic electrolyte salts in the imbibed solution will be correspondingly much greater than this desired final concentration.

EXAMPLES

Several embodiments of the present invention are described in the following examples, which are offered by way of illustration and not by way of limitation.

Example 1

A microporous layer of pseudo-boehmite with polyvinyl alcohol binder present was prepared according to the following procedure. A coating mixture with a solids content of about 8% comprising 7 weight per cent (solid content) of CATALOID AS-3 (a tradename for boehmite sol available from Catalysts & Chemicals Ind. Co., Ltd., Tokyo, Japan) and 0.7 weight per cent (solid content) of AIRVOL 125 (a trademark for polyvinyl alcohol polymer available from Air Products, Inc., Allentown, Pa.) in water was prepared. This coating mixture was coated on 100 micron thick MELINEX 516 film (a trademark for polyethylene terephthalate (PET) film available from ICI Polyester, Wilmington, Del.) using a gap coater so that the dry pseudo-boehmite coating thickness would be 25 microns and followed by drying at 130° C. Alternatively, the dry coating thickness of 25 microns was obtained by multiple passes of coating application and drying such as two consecutive coating applications with thicknesses of about 12.5 microns of dry coating. After drying, the coated film was soaked in a solution of 67:33 by volume of water:isopropanol. This lowered the adhesion of the coating to the PET film so that the 25 micron pseudo-boehmite coating could be delaminated from the PET film substrate.

The pore volume of this 25 micron free standing pseudo-boehmite film was determined by the method of soaking a piece of film with a known area in liquid polyethylene glycol dimethyl ether, wiping the excess liquid from the film surface, and weighing the film before and after imbibing the liquid. By this method, using Equation I:

$$\text{Pore Volume} = \frac{[W_1 - W_2]/d}{W_2} \qquad \text{I}$$

wherein $W_1$ is the weight of the film when the pores are completely filled with the liquid, $W_2$ is the weight of the film with no liquid present in the pores, and d is the density of the liquid, the pore volume of the 25 micron pseudo-boehmite film was measured to be 0.67 cm$^3$/g. The porosity was calculated as 65% using Equation III. Using the same method, the porosity of CELGARD 2500 polyethylene separator film (trademark for porous polyolefin films, such as this 25 micron thick polyethylene film, available from Hoechst Celanese Corporation, Charlotte, N.C.) was calculated as 48%. As an alternative method, the actual density of the 25 micron pseudo-boehmite film was measured as 1.0 g/cm$^3$, and the theoretical density (assuming no pores) was calculated as 2.8 g/cm$^3$. From this, by subtracting the reciprocal of the theoretical density from the reciprocal of the measured density as in Equation II, the pore volume was estimated as 0.64 cm$^3$/g. The porosity was calculated as 64%.

Example 2

A 5% by weight solution of a 1:1 ratio by weight of PHOTOMER 4028 (a trademark for radiation curable oligomers, such as this ethoxylated bisphenol A diacrylate, available from Henkel Corp., Ambler, Pa.) and PHOTOMER 6210 (an ethoxylated aliphatic urethane diacrylate also available from Henkel Corp., Ambler, Pa.) was prepared by dissolving these oligomers in methyl acetate. To this solution, 0.2% by weight (based on the total weight of the oligomers) of ESCURE KTO (a trademark for photosensitizers available from Sartomer Inc., Exton, Pa.) was added and dissolved by stirring to give the final solution for treatment of the pseudo-boehmite film.

A 25 micron thick free-standing pseudo-boehmite film, prepared according to Example 1, was dipped in the above solution of oligomers and photosensitizer so that the pores of the pseudo-boehmite film were completely filled with the solution. Excess liquid was removed from the surface of the pseudo-boehmite film by using a smooth coating blade. The film was then dried at 25° C. in a laboratory hood with moderate exhaust air flow. The dried film was then cured by placing it on the conveyor belt of a FUSION Model P300 UV exposure unit (a tradename for radiation curing equipment available from Fusion Systems Company, Torrance, Calif.) and exposing it to the UV lamps for 30 seconds. The resulting 25 micron thick pseudo-boehmite separator film with polymer treatment was insoluble in water and in 1,3-dioxolane, methyl acetate, and dimethoxyethane (DME). By weighing the pseudo-boehmite separator film before and after the polymer treatment, the increase in weight from a single dipping process and subsequent cure, as described above, corresponded to filling about 18% of the available void volume of the pseudo-boehmite layer with cured polymer materials. Since the porosity or void volume of the pseudo-boehmite layer of Example 1 is about 65%, the void volume of the pseudo-boehmite layer remaining after this polymer treatment was calculated to be about 53%.

Comparative Example 1

A cathode was prepared by coating a mixture of 55 parts of elemental sulfur, 15 parts of CAB-O-SIL TS-530 silica (a trademark for silica pigment available from Cabot Corporation, Tuscola, Ill.), 15 parts of conductive carbon pigment (Shawingan Acetylene Black or SAB-50, a trademark for carbon pigments available from Chevron Corporation, Baytown, Tex.), and 15 parts of polyethylene oxide (PEO) binder (5,000,000 molecular weight available from Polysciences Inc., Warrington, Pa.) in acetonitrile as the solvent onto an 18 micron thick nickel foil substrate to give a cathode coating thickness of about 25 microns. The anode was lithium foil of about 175 microns in thickness. The electrolyte was a 1.0 M solution of lithium triflate in tetraethylene glycol dimethyl ether (tetraglyme). The porous separator used was CELGARD 2500.

The above components were combined into a layered structure of cathode/separator/anode with the liquid electrolyte filling the void areas of the separator and cathode to form disc-shaped CR2032 coin cells of 2 cm$^2$ in area.

Discharge-charge cycling on these cells was done at 0.2 mA or 0.1 mA/cm$^2$ for the first two cycles and then at 1 mA or 0.5 mA/cm$^2$ for additional cycles. The average capacity for 4 coin cells was 1.9 mAh on the first cycle and 1.3 mAh on the fifth cycle.

Two different coin cells were cycled at 0.4 mA (0.2 mA/cm$^2$) discharge and charge from the first cycle. The average capacity for these 2 coin cells with CELGARD 2500 polyethylene separator was 0.8 mAh (specific capacity of 466 mAh/g of elemental sulfur in the cell) on the fifth cycle and was 0.7 mAh (specific capacity of 408 mAh/g) on the 15th cycle.

Example 3

Coin cells were constructed as in Comparative Example 1 except that the 25 micron pseudo-boehmite separator film from Example 1 was substituted for the 25 micron CELGARD 2500 polyethylene film. Discharge-charge cycling was done under the same first set of conditions (0.2 mA for first two cycles and then 1 mA) as in Comparative Example 1. The average capacity for 2 coin cells with the 25 micron pseudo-boehmite separator of Example 1 was 1.9 mAh on the first cycle and 1.4 mAh on the fifth cycle. This shows cell performance and cycling similar to Comparative Example 1 with the conventional porous polyethylene separator (CELGARD 2500).

Another coin cell was cycled at a second set of conditions, namely 1.0 mA (0.5 mA/cm$^2$) discharge and charge from the first cycle. The capacity of this coin cell with pseudo-boehmite separator was 1.0 mAh (specific capacity of 633 mAh/g of elemental sulfur in the cell) on the fifth cycle and was 0.7 mAh (specific capacity of 466 mAh/g) on the 33rd cycle. Although the significantly higher discharge and charge rates for this cell would be expected to lower its capacity and cycling stability compared to the two coin cells in Comparative Example 1 with lower discharge-charge rates, this cell with pseudo-boehmite separator had better capacity and cycle stability than the two cells with the porous polyethylene separator tested at 0.4 mA charge and discharge in Comparative Example 1.

Comparative Example 2

A cathode was prepared by coating a mixture of 80 parts of a carbon-sulfur polymer with an average polysulfide chain length of about 5 and with about 90% sulfur content (made by the process described in Example 2 in a copending U.S. patent application Ser. No. 08/995,112 to Gorkovenko et al. to the common assignee); 10 parts of a conductive carbon pigment, PRINTEX XE-2 (a trademark for carbon pigments available from Degussa Corporation, Akron, Ohio); 5 parts of PYROGRAF-III carbon nanofiber (a trademark for carbon filaments available from Applied Sciences, Inc., Cedarville, Ohio); and 5 parts of a 4:1 by weight ratio of poly(acrylamide-co-diallyldimethylammonium chloride) (available from Aldrich Chemical Company, Milwaukee, Wis.) and of polyethylene oxide or PEO (as described in Comparative Example 1) at about 12% solids in a blend of 13:1 ethanol:water onto a 17 micron thick conductive carbon and resin coated aluminum foil substrate (Product No. 60303 available from Rexam Graphics, South Hadley, Mass.). The cathode coating thickness was about 25 microns. The anode was lithium foil of about 75 microns in thickness. The electrolyte was a 0.75 M solution of lithium imide (available from 3M Corporation, St. Paul, Minn.) in a 50:50 by volume mixture of 1,3-dioxolane and dimethoxyethane (DME). The porous separator used was E25 SETELA (a trademark for polyolefin separators available from Tonen Chemical Corporation, Tokyo, Japan, and also available from Mobil Chemical Company, Films Division, Pittsford, N.Y.).

The above components were combined into a layered structure of cathode/separator/anode with the liquid electrolyte filling the void areas of the separator and cathode to form vial cells of about 40 cm$^2$ in area. Discharge-charge cycling on these cells was done at 8 mA or 0.2 mA/cm$^2$ with discharge cutoff at a voltage of 1.3 V and charge cutoff at 150% overcharge of the previous discharge capacity or 2.8 V, whichever came first. Typical capacity of these cells was 32 mAh (specific capacity of 575 mAh/g of carbon-sulfur polymer in the cell) at the fifth cycle with a total capacity fade of about 25% over the next 25 cycles. The charging at each cycle was to the 150% overcharge limit. The 2.8 V cutoff was not reached on the charging half of the cycle. Thus, charging was relatively inefficient and required at least a 50% extra charge on each cycle to recharge after the discharge.

Comparative Example 3

Vial cells were constructed as in Comparative Example 2 except that 80 parts of elemental sulfur were substituted for the 80 parts of carbon-sulfur polymer in the mixture used to prepare the cathode. Discharging of the cells was done at 0.33 mA/cm$^2$, and charging of the cells was done at 0.22 mA/cm$^2$. The discharge and charge cutoff conditions were the same as in Comparative Example 2. Typical specific capacity of these cells was 460 mAh/g of elemental sulfur in the cell at the 5th cycle with no significant loss in specific capacity out to 70 cycles. As in Comparative Example 2, the charging at each cycle on these cells was to the 150% overcharge limit. The 2.8 V cutoff was not reached on the charging half of the cycle.

Example 4

Vial cells were constructed as in Comparative Example 2 except that the 25 micron pseudo-boehmite separator film with polymer treatment from Example 2 was substituted for the 25 micron E25 SETELA separator film. Discharge-charge cycling was done under the same set of conditions as in Comparative Example 2. Typical capacity of these cells was 25 mA (specific capacity of 613 mAh/g of carbon-sulfur polymer in the cell) at the fifth cycle with a total capacity fade of about 14% over the next 25 cycles and of about 28% over the next 65 cycles. The charging at each cycle was to the 2.8 V cutoff. The 150% overcharge limit was not reached on the charging half of the cycle. The amount of overcharge before reaching the 2.8 V cutoff remained in the range of 105 to 120% during the cycling. This data shows the specific capacities, capacity fading, and charging conditions and efficiencies of the cells with the pseudo-boehmite separator to be significantly better than that of the cells with the conventional polyolefin separator of Comparative Example 2.

A self-discharge test was performed by resting the cells for 24 hours after the 5th, 10th, and 30th cycles and then measuring the loss in capacity. The self-discharge was 5.8%, 2.6%, and 2.7% after the 5th, 10th, and 30th cycles, respectively. By contrast, the self-discharge of cells from Comparative Example 2 was in the range of 10 to 20%.

Example 5

Vial cells were constructed as in Comparative Example 3 except that the 25 micron pseudo-boehmite separator film with polymer treatment from Example 2 was substituted for the 25 micron E25 SETELA separator film. Discharge-charge cycling was done under the same set of conditions as in Comparable Example 3. Typical specific capacity of these cells was 600 mAh/g of elemental sulfur in the cell at the 5th cycle with a total capacity fade of about 15% out to 70 cycles. The charging at each cycle was to the 2.8 V cutoff. The 150% overcharge limit was not reached on the charging half of the cycle. The amount of overcharge before reaching the 2.8 V cutoff remained in the range of 110 to 140% during the cycling. This data shows the specific capacities and charging conditions and efficiencies of the cells with the pseudo-boehmite separator to be significantly better than that of the cells with the conventional polyolefin separator of Comparative Example 3. The capacity fade of the cells with the pseudo-boehmite separator is greater than in Comparative Example 3, but the specific capacity at the 70th cycle and the accumulated capacity out to 70 cycles are significantly better than Comparative Example 3.

Example 6

Vial cells were constructed as in Example 5 except that an 11 micron thick pseudo-boehmite separator film with polymer treatment was used instead of the 25 micron thick pseudo-boehmite separator film with polymer treatment. The 11 micron pseudo-boehmite separator film with polymer treatment was prepared as in Examples 1 and 2, except that DISPAL 11N7-12 (a trademark for boehmite sol available from CONDEA Vista Company, Houston, Tex.) was used instead of CATALOID AS-3, and the gap of the gap coater was reduced so that the dry pseudo-boehmite coating thickness was 11 microns. Discharge-charge cycling performed under the same set of conditions as in Example 5 gave similar specific capacities, capacity fading, and charging properties as in Example 5. This shows that the large reduction in thickness in the pseudo-boehmite separator from 25 to 11 microns still provides satisfactory performance and retains significant advantages over the thicker 25 micron polyolefin separators. No formation of short circuits was observed during cycling of these cells to over 100 cycles. This is further evidence that the pseudo-boehmite separator is stable during cycling and is not degrading such that the formation of short circuits occurs.

Example 7

Vial cells were constructed as in Example 6, except that a 12 micron thick pseudo-boehmite separator layer was coated directly on the cathode instead of using the free standing separator of Example 6; the oligomer treatment with curing was done after the direct coating of the separator; and changes were made in the cathode and the electrolyte. As in Example 6, DISPAL 11N7-12 instead of CATALOID AS-3 was used for the boehmite sol. The approximately 8% by weight solids mixture of 10:1 DISPAL 11N7-12:AIRVOL 125 in water was applied in two coating passes of approximately equal coating weight application to give a total pseudo-boehmite layer thickness of 12 microns. The cathode used was the same as in Comparative Example 3, except that 85 parts of elemental sulfur was used instead of 80 parts; the amount of conductive carbon pigment, PRINTEX XE-2, was increased to 12 parts; the amount of PYROGRAF-III carbon nanofiber was reduced to 2 parts; and no polymeric binder was present. The cathode coating thickness was about 16 microns. The UV curable oligomer and photosensitizer solution was the same as in Example 2. This solution was applied by a blade coating to the outermost surface of the pseudo-boehmite separator layer coated on the cathode so that the pores of the pseudo-boehmite layer were completely filled with the solution. The excess liquid was removed from the surface and the pseudo-boehmite layer then dried and cured by UV radiation, as described in Example 2. The electrolyte was a 1.0 M solution of lithium triflate (available from 3M Corporation, St. Paul, Minn.) in a 50:35:10:5 by volume mixture of 1,3-dioxolane:diethylene glycol dimethyl ether (diglyme):DME:o-xylene.

Discharge-charge cycling was done under the same set of conditions as in Example 5. Typical specific capacities of these cells were 550 mAh/g of elemental sulfur in the cell at the 5th cycle with a total capacity fade of about 20% out to 100 cycles. The charging at each cycle was to a 3.0 V cutoff. The 150% overcharge limit was not reached on the charging half of the cycle. The amount of overcharge before reaching the 3.0 V cutoff remained in the range of 125 to 145% during the cycling. This data shows that cells with a pseudo-boehmite separator layer coated directly on the cathode provided comparable specific capacities, capacity fading, and charging properties to cells with a free standing pseudo-boehmite separator of similar composition and had satisfactory performance at a dry thickness of only 12 microns.

Example 8

Vial cells were constructed as in Example 7, except that a 50:50 by weight mixture of PEO (600,000 molecular weight):PEO (5,000,000 molecular weight), both available from Polysciences Inc., Warrington, Pa., was used instead of the AIRVOL 125 polyvinyl alcohol polymer; and the electrolyte as described in Comparative Example 2 was used. Discharge, charge, and cutoff conditions were the same as in Example 7. The specific capacities, capacity fading, and charging properties were similar to those reported in Example 7. This illustrates that other polymeric binders, such as polyethylene oxides, can be used instead of polyvinyl alcohol to form the microporous separator of the present invention.

Comparative Example 4

The carbon electrode was prepared using 85 parts of graphite powder (MCMB 10-28 available from Osaka Gas, Osaka, Japan), 5 parts of conductive carbon (SAB-50), and 10 parts of KYNAR 500LVD binder (a trademark for vinylidene fluoride-tetrafluoroethylene copolymer available from Elf Atochem North America, Inc., Philadelphia, Pa.) in N-methyl pyrrolidone as the solvent to give a coating thickness of about 75 microns on a 13 micron thick copper foil substrate. The other electrode was lithium foil of about 175 microns in thickness. The electrolyte was a 1.0 M solution of $LiPF_6$ in an 1:1 by volume mixture of ethylene carbonate (EC): dimethyl carbonate (DMC). The porous separator used was CELGARD 3401, a special grade of polyolefin separator with a wetting agent treatment present.

The above components were combined into a layered structure of carbon electrode/separator/lithium foil with the liquid electrolyte filling the void areas of the separator and cathode to form disc-shaped CR2032 coin cells of 2 $cm^2$ in area.

Discharge-charge cycling on these cells was done at 0.2 mA or 0.1 $mA/cm^2$ for the first two cycles and then at 1 mA or 0.5 $mA/cm^2$ for additional cycles. The average capacity for 8 of these coin cells was 8.9 mAh on the second cycle.

Example 9

A coin cell was constructed as in Comparative Example 4, except that the 25 micron pseudo-boehmite separator film from Example 1 was substituted for the 25 micron CELGARD 3401 polyolefin film. Discharge-charge cycling was done under the same conditions as in Comparative Example 4. The carbon-lithium coin cell with the 25 micron pseudo-boehmite separator of Example 1 had a capacity of 6.0 mAh on the second cycle and a capacity of 6.2 mAh on the sixth cycle. Although the capacity with the pseudo-boehmite separator is lower on the second charge-discharge cycle than with the CELGARD 3401 polyolefin separator, the capacity is still good. The lack of capacity fade upon charge-discharge cycling with the pseudo-boehmite separator is also positive.

The pseudo-boehmite separator of this invention with its excellent wetting properties exhibits flexibility in its broad compatibility with various cathode and electrolyte solvent/lithium salt combinations, such as sulfur-based cathodes and electrolyte compositions for both sulfur-based and for lithium ion type batteries, without requiring a special treatment with a wetting agent. In particular, the wettability of the separator to the different electrolytes commonly used in batteries is often problematical. For example, the combination of electrolyte solvent and lithium salt of Comparative Example 4 does not wet conventional polyolefin separators, such as CELGARD 2500, adequately so a surfactant or wetting agent treatment must be applied to the separator surface. However, there is a concern about possible negative effects of a surfactant treatment on battery performance.

Comparative Example 5

A cathode was prepared by coating a mixture of 75 parts of elemental sulfur (available from Aldrich Chemical Company, Milwaukee, Wis.), 20 parts of PRINTEX XE-2 conductive carbon pigment, and 5 parts of PYROGRAF-III carbon nanofibers dispersed at 10% solids in isopropanol onto a 17 micron thick conductive carbon and resin coated aluminum foil substrate (Product No. 60303). After heating at 130° C. for 1 minute and calendering, the thickness of the cathode active layer was about 10 microns. The anode was lithium foil of about 50 microns in thickness. The electrolyte was a 1.424 M solution of lithium imide in a 41.5:58.5 volume ratio of 1,3-dioxolane and dimethoxyethane. The porous separator used was 16 micron thick E25 SETELA polyolefin separator.

The above components were combined into a layered structure of cathode/separator/anode, which was wound and compressed, with the liquid electrolyte filling the void areas of the separator and cathode active layer to form prismatic cells of 500 $cm^2$ in area. Discharge/charge cycling on these cells was done at 0.5/0.3 $mA/cm^2$, respectively, with discharge cutoff at 1.3 V and charge cutoff at 3 V or 120% of the discharge capacity of the last cycle, whichever came first. Typical capacity of these cells was about 500 mAh (specific capacity of 1030 mAh/g of the elemental sulfur in the cell) at the 10th cycle with a total capacity fade of about 14% over the next 50 cycles.

Example 10

A microporous layer comprising pseudo-boehmite with binder present was prepared according to the following procedure. A water-based coating mixture with a solids content of about 8% comprising 86 parts by weight (solid content) of DISPAL 11N7-12 boehmite sol, 6 parts by weight (solid content) of AIRVOL 125 polyvinyl alcohol polymer, 3 parts by weight of polyethylene glycol (molecular weight of 900,000 available from Aldrich Chemical Company, Milwaukee, Wis.), and 5 parts by weight of polyethylene glycol dimethylether, M-250 (available from Fluka Chemical Company, Ronkonkoma, N.Y.), in water was prepared. This coating mixture was coated directly on a cathode with a cathode active layer prepared as described in Comparative Example 5, using a slot die extrusion coating application with two successive coating applications of similar thickness to provide a total dry pseudo-boehmite coating thickness of about 12 microns.

A 5% by weight solution of a 3:2 ratio by weight of CD 9038 (a tradename for ethoxylated bisphenol A diacrylate available from Sartomer Inc., Exton, Pa.) and CN 984 (a tradename for a urethane acrylate available from Sartomer Inc., Exton, Pa.) was prepared by dissolving these oligomers in ethyl acetate. To this solution, 0.2% by weight (based on the total weight of acrylate oligomers) of ESCURE KTO was added. This coating solution also contained 5% by weight of CAB-O-SIL TS-530 silica pigment, which was dispersed in the oligomer solution by sonication. The oligomer solution was coated on the 12 micron thick microporous layer comprising pseudo-boehmite and binder and then dried to remove the solvent present. The coating thickness of the dried coating on top of the pseudo-boehmite layer was about 4 microns. The dried film was then cured by UV curing using a Model F450T UV exposure unit (available from Fusion Systems Corporation, Rockville, Md.). After heating at 110° C. for 4 minutes, these cathodes were ready for assembly into electric current producing cells.

Prismatic cells of 500 $cm^2$ in area were constructed as described in Comparative Example 5. The electrolyte was the same as that used in Comparative Example 5. Discharge/charge cycling was performed on these cells at the same current densities as described in Comparative Example 5. The specific capacity of the cells was about 850 mAh/g for the elemental sulfur in the cell at the 5th cycle with a total capacity fade of about 17% over the next 80 cycles. After 100 cycles, the average capacity of these cells was 77% of the specific capacity at the 5th cycle.

Example 11

18% by weight of DISPAL 11N7-80 boehmite powder (available from CONDEA Vista Company, Houston, Tex.) was added slowly into ethanol solvent under stirring by a 1 horsepower laboratory mixer and emulsifier (Ross Model ME-100LX) and stirred at about 2500 rpm for 5 minutes followed by additional stirring for 15 minutes at 4750 rpm.

A microporous layer comprising pseudo-boehmite was prepared according to the following procedure. A coating mixture with a solid content of about 14% comprising 85 parts by weight (solid content) of DISPAL 11N7-80 boehmite powder (18% solids dispersion in ethanol), 12 parts by weight (solid content) of MOWITAL B60H (a trademark for polyvinyl butyral binders available from Hoechst Celanese Corporation, Charlotte, N.C.), and 3 parts by weight of M-250 polyethylene glycol dimethyl ether in ethanol was prepared and then coated as described in Example 10.

Prismatic cells were prepared as described in Example 10, except that the microporous layer comprising pseudo-boehrnite was obtained by using the above ethanol-based boehmite coating mixture. The electrolyte used was the same as that used in Example 10. Discharge/charge cycling was performed on these cells at the same current densities as in Example 10. The specific capacity of the cells was about 1030 mAh/g of the elemental sulfur in the cell at the 10th cycle with a total capacity fade of only about 13% over the next 130 cycles. After 150 cycles, the average capacity of these cells was above 85% of the specific capacity at the 10th cycle.

While the invention has been described in detail and with reference to specific and general embodiments thereof, it will be apparent to one skilled in the art that various changes and modifications can be made therein without departing from the spirit and scope thereof.

What is claimed is:

1. A separator for use in an electric cunent producing cell for separating an anode and a cathode, wherein said separator comprises a microporous layer comprising pseudo-boehmite and a binder;

wherein said binder is an inorganic binder.

2. The separator of claim 1, wherein said binder is present in an amount of 3 to 200% of the weight of pseudo-boehmite in said microporous layer.

3. The separator of claim 1, wherein said binder is present in an amount of 5 to 70% of the weight of pseudo-boehmite in said microporous layer.

4. The separator of claim 1, wherein said binder is selected from the group consisting of colloidal silicas, colloidal non-hydrated aluminum oxides, colloidal tin oxides, colloidal titanium oxides, colloidal zirconium oxides, and colloidal zinc oxides.

5. The separator of claim 1, wherein pores of said microporous layer are impregnated with a composition comprising a polymer.

6. The separator of claim 1, wherein said microporous layer has a thickness of from 1 micron to 50 microns.

7. A separator for use in an electric current producing cell for separating an anode and a cathode, wherein said separator comprises a microporous layer comprising pseudo-boehmite and a binder;
wherein pores of said microporous layer are impregnated with a composition comprising a polymer; and
wherein said polymer is ionically conductive.

8. The separator of claim 7, wherein said binder is an organic binder.

9. The separator of claim 7, wherein said binder is selected from the group consisting of polyvinyl alcohols, polyethylene oxides, alkylated polyethylene oxides, polyvinyl pylTolidones, polyvinyl butyrals, hydroxyethyl cellulose, cellulose acetate propionate, polymers comprising quaternary ammonium groups, polyacrylamides, polyvinyl ethers, polyethyleneimines, polyurethanes, epoxies, melamine formaldehydes, urea formaldehydes; copolymers thereof; copolymers of maleic anhydride and derivatives and esters thereof; gelatin; starch; and mixtures of the foregoing binders.

10. The separator of claim 7, wherein said binder is an inorganic binder.

11. The separator of claim 7, wherein said binder further comprises one or more additives selected from the group consisting of pigments, crosslinking agents, catalysts for non-radiation curing, sensitizers for radiation curing, plasticizers, surfactants, and dispersants.

12. The separator of claim 7, wherein said composition further comprises a crosslinking agent.

13. The separator of claim 7, wherein said microporous layer has a thickness of from 1 micron to 25 microns.

14. The separator of claim 7, wherein said microporous layer has a thickness of from 2 microns to 15 microns.

15. An electrolyte element for use in an electric current producing cell for separating an anode and a cathode, wherein said electrolyte element comprises:
(a) a separator comprising a microporous layer comprising pseudo-bochmite and a binder; and
(b) an organic electrolyte contained within pores of said microporous layer.

16. The electrolyte element of claim 15, wherein said binder is present in an amount of 3 to 200% of the weight of pseudo-boehmite in said microporous layer.

17. The electrolyte element of claim 15, wherein said binder is present in an amount of 5 to 70% of the weight of pseudo-boehmite in said microporous layer.

18. The electrolyte element of claim 15, wherein said binder is an organic binder.

19. The electrolyte element of claim 15, wherein said binder is selected from the group consisting of polyvinyl alcohols, polyethylene oxides, alkylated polyethylene oxides, polyvinyl pyrrolidones, polyvinyl butyrals, hydroxyethyl cellulose, cellulose acetate propionate, polymers comprising quartemary ammonium groups, polyacrylamides polyvinyl ethers, polyethyleneimines, polyurethanes, epoxies, melamine formaldehydes, urea formaldehydes; copolymers thereof; copolymers of maleic anhydride and derivatives and esters thereof; gelatin, starch; and mixtures of the foregoing binders.

20. The electrolyte element of claim 15, wherein said binder is an inorganic binder.

21. The electrolyte clement of claim 15, wherein said binder is selected from the group consisting of colloidal silicas, colloidal non-hydrated aluminum oxides, colloidal tin oxides, colloidal titanium oxides, colloidal zirconium oxides, and colloidal zinc oxides.

22. The electrolyte element of claim 15, wherein said binder further comprises one or more additives selected from the group consisting of pigments, crosslinking agents, catalysts for non-radiation curing, sensitizers for radiation curing, plasticizers, surfactants, and dispersants.

23. The electrolyte element of claim 15, wherein said organic electrolyte comprises one or more materials selected from the group consisting of liquid electrolytes, gel polymer electrolytes, and solid polymer electrolytes.

24. The electrolyte element of claim 15, wherein said microporous layer has a thickness of from 2 microns to 15 microns.

25. A method of making a separator for use in an electric current producing cell for separating an anode and a cathode, said separator comprising a microporous layer comprising pseudo-boehmite and a binder, wherein said method comprises the steps of:
(a) coating onto a substrate a liquid mixture comprising a boehmite sol, a binder, and a liquid medium; and
(b) drying the coating formed in step (a) to yield said microporous layer;
wherein said binder is an inorganic binder.

26. The method of claim 25, wherein said liquid medium comprises water.

27. The method of claim 25, wherein said liquid medium comprises one or more organic solvents.

28. The method of claim 25, wherein said liquid medium comprises one or more protic organic solvents selected from the group consisting of alcohols and glycols.

29. The method of claim 25, wherein said liquid medium comprises one or more protic organic solvents selected from the group consisting of methanol, ethanol, isopropanol, 1-propanol, 1-butanol, 2-butanol, 2-methoxyethanol, 2-ethoxyethanol, 2-butoxyethanol, ethylene glycol, and propylene glycol.

30. The method of claim 25, wherein said liquid medium comprises ethanol.

31. The method of claim 25, wherein said liquid medium comprises water and one or more organic solvents.

32. The method of claim 25, wherein said binder is present in an amount of 3 to 200% of the weight of pseudo-boehmite in said microporous layer.

33. The method of claim 25, wherein said binder is present in an amount of 5 to 70% of the weight of pseudo-boehmite in said microporous layer.

34. The method of claim 25, wherein said binder is selected from the group consisting of colloidal silicas, colloidal non-hydrated aluminum oxides, colloidal tin oxides, colloidal titanium oxides, colloidal zirconium oxides, and colloidal zinc oxides.

35. The method of claim 25, wherein pores of said microporous layer are impregnated with a composition comprising a polymer.

36. The method of claim 25, wherein said microporous layer has a thickness of from 1 micron to 50 microns.

37. A method of making a separator for use in an electric current producing cell for separating an anode and a cathode, said separator comprising a microporous layer comprising pseudo-boehmite and a binder, wherein said method comprises the steps of:

(a) coating onto a substrate a liquid mixture comprising a boehmite sol, a binder, and a liquid medium; and (b) drying the coating formed in step (a) to yield said microporous layer;

wherein pores of said microporous layer are impregnated with a composition comprising a polymer; and wherein said polymer is ionically conductive.

38. The method of claim 37, wherein said binder is an organic binder.

39. The method of claim 37, wherein said binder is selected from the group consisting of polyvinyl alcohols, polyethylene oxides, alkylated polyethylene oxides, polyvinyl pyrrolidones, polyvinyl butyrals, hydroxyethyl cellulose, cellulose acetate propionate, polymers comprising quaternary ammonium groups, polyacrylamides, polyvinyl ethers, polyethylenieimines, polyurethanes, epoxies, melamine formaldehydes, urea formaldehydes; copolymers thereof; copolymers of maleic anhydride and derivatives and esters thereof; gelatin; starch; and mixtures of the foregoing binders.

40. The method of claim 37, wherein said binder is an inorganic binder.

41. The method of claim 37, wherein said binder further comprises one or more additives selected from the group consisting of pigments, crosslinking agents, catalysts for non-radiation curing, sensitizers for radiation curing, plasticizers, surfactants, and dispersants.

42. The method of claim 37, wherein said composition further comprises a crosslinking agent.

43. The method of claim 37, wherein said microporous layer has a thickness of from 1 micron to 25 microns.

44. The method of claim 37, wherein said microporous layer has a thickness of from 2 microns to 15 microns.

45. A method of making a separator for use in an electric current producing cell for separating an anode and a cathode, said separator comprising a microporous layer comprising pseudo-boehmite and a binder, wherein said method comprises the steps of:

(a) coating onto a substrate a liquid mixture comprising a boehmite sol, a binder, and a liquid medium; and (b) drying the coating formed in step (a) to yield said microporous layer;

wherein at least one outermost surface of said substrate comprises a cathode layer and said liquid mixture is coated onto said cathode layer.

46. The method of claim 45, further comprising, subsequent to step (b), the steps of:

(c) contacting a surface of said microporous layer with a solution comprising heat- or radiation-curable monomers or oligomers, thereby causing infusion of said monomers or said oligomers into pores of said microporous layer; and, (d) curing said monomers or said oligomers with an energy source selected from the group consisting of: heat, ultraviolet light, visible light, infrared radiation, and electron beam radiation; thereby forming a polymer.

47. The method of claim 46, wherein said polymer formed in step (d) is an ionic conductive polymer.

48. A method of making a separator for use in an electric current producing cell for separating an anode and a cathode, said separator comprising a microporous layer comprising pseudo-boehmite and a binder, wherein said method comprises the steps of:

(a) coating onto a substrate a liquid mixture comprising a boehmite sol, a binder, and a liquid medium;

(b) drying the coating formed in step (a) to yield said microporous layer; and (c) delaminating said microporous layer from said substrate;

wherein at least one outermost surface of said substrate comprises a release layer and said liquid mixture is coated onto said release layer.

49. The method of claim 48, further comprising, subsequent to step (b) and prior to step (c), the steps of:

(i) contacting a surface of said microporous layer with a solution comprising heat- or radiation-curable monomers or oligomers, thereby causing infusion of said monomers or said oligomers into pores of said microporous layer; and (ii) curing said monomers or said oligomers with an energy source selected from the group consisting of heat, ultraviolet light, visible light, infrared radiation, and electron beam radiation; thereby forming a polymer.

50. The method of claim 49, wherein said polymer formed in step (ii) is an ionic conductive polymer.

51. A method of making a separator for use in an electric current producing cell for separating an anode and a cathode, said separator comprising a microporous layer comprising pseudo-boehmite and a binder, wherein said method comprises the steps of:

(a) coating onto a substrate a liquid mixture comprising a boehmite sol, a binder, and a liquid medium; and (b) drying the coating formed in step (a) to yield said microporous layer;

(c) contacting a surface of said microporous layer with a coating solution comprising a solid material and a liquid medium; and (d) drying the coating formed in step (c) to yield a coating layer comprising said solid material;

wherein at least one outermost surface of said substrate comprises a release layer and said liquid mixture is coated onto said release layer.

52. The method of claim 51, wherein said binder is an organic binder.

53. The me thod of claim 51, wherein said binder is an organic binder.

54. The method of claim 51, further comprising, subsequent to step (d), the step of:

(e) delaminating said microporous layer from said substrate.

55. The method of claim 51, wherein said coating layer formed in step (d) is a cathode layer.

56. The method of claim 55, further comprising, subsequent to step (d), the step of:

(e) delaminating said microporous layer from said substrate.

57. A method of making an electrolyte element for an electric current producing cell, said electrolyte element comprising a microporous layer comprising pseudo-boehmite and a binder, wherein said method comprises the steps of:

(a) coating onto a substrate a liquid mixture comprising a boehmite sol, a binder, and a liquid medium;

(b) drying the coating formed in step (a) to yield said microporous layer; and, (c) contacting a surface of said microporous layer with an organic electrolyte, thereby causing infusion of said electrolyte into pores of said microporous layer.

58. The method of claim 57, wherein said liquid medium comprises water.

59. The method of claim 57, wherein said liquid medium comprises one or more organic solvents.

60. The method of claim 57, wherein said liquid medium comprises one or more protic solvents selected from the group consisting of: alcohols and glycols.

61. The method of claim 57, wherein said liquid medium comprises water and one or more organic solvents.

62. The method of claim 57, wherein said binder is present in an amount of 3 to 200% of the weight of pseudo-boehmite in said microporous layer.

63. The method of claim 57, wherein said binder is present in an amount of 5 to 70% of the weight of pseudo-boehmite in said microporous layer.

64. The method of claim 57, wherein said binder is an organic binder.

65. The method of claim 57, wherein said binder is selected from the group consisting of polyvinyl alcohols, polyethylene oxides, alkylated polyethylene oxides, polyvinyl pyrrolidones, polyvinyl butyrals, hydroxyethyl cellulose, cellulose acetate propionate, polymers comprising quarternary ammonium groups, polyacrylamides, polyvinyl ethers, polyethyleneimines, polyurethanes, epoxies, melamine formaldehydes, urea formaldehydes; copolymers thereof; copolymers of maleic anhydride and derivatives and esters thereof; gelatin, starch; and mixtures of the foregoing binders.

66. The method of claim 57, wherein said binder is an inorganic binder.

67. The method of claim 57, wherein said binder is selected from the group consisting of:

colloidal silicas, colloidal non-hydrated aluminum oxides, colloidal tin oxides, colloidal titanium oxides, colloidal zirconium oxides, and colloidal zinc oxides.

68. The method of claim 57, wherein said binder further comprises one or more additives selected from the group consisting of:

pigments, crosslinking agents, catalysts for non-radiation curing, sensitizers for radiation curing, plasticizers, surfactants, and dispersants.

69. The method of claim 57, wherein said organic electrolyte comprises one or more materials selected from the group consisting of:

liquid electrolytes, gel polymer electrolytes, and solid polymer electrolytes.

70. The method of claim 57, wherein said organic electrolyte comprises heat- or radiation-curable monomers or oligomers.

71. The method of claim 70, further comprising, subsequent to step (c), the step of:

(d) curing said monomers or said oligomers with an energy source selected from the group consisting of: heat, ultraviolet light, visible light, infrared radiation, and electron beam radiation.

72. The method of claim 57, wherein at least one outermost surface of said substrate comprises a cathode layer and said liquid mixture is coated onto said cathode layer.

73. The method of claim 72, further comprising, subsequent to step (b) and prior to step (c), the steps of:

(i) contacting a surface of said microporous layer with a solution comprising heat- or radiation-curable monomers or oligomers, thereby causing infusion of said monomers or said oligomers into pores of said microporous layer; and, (ii) curing said monomers or said oligomers with an energy source selected from the group consisting of: heat, ultraviolet light, visible light, infrared radiation, and electron beam radiation; thereby forming a polymer.

74. The method of claim 72, further comprising, subsequent to step (b) and prior to step (c), the steps of:

(i) contacting a surface of said microporous layer with a coating solution comprising a solid materi al and a liquid medium; and, (ii) drying the coating formed in step (i) to yield a coating layer comprising said solid material.

75. An electric current producing cell comprising a cathode, an anode, and an electrolyte element interposed between said cathode and said anode, wherein said electrolyte element comprises:

(a) a separator comprising a microporous layer, which microporous layer comprises pseudo-boehmite and a binder; and, (b) an organic electrolyte contained within pores of said microporous layer.

76. The cell of claim 75, wherein said binder is present in an amount of 3 to 200% of the weight of pseudo-boehmite in said microporous layer.

77. The cell of claim 75, wherein said binder is an organic binder.

78. The cell of claim 75, wherein said binder is an inorganic binder.

79. The cell of claim 75, wherein said cell is a secondary electric current producing cell.

80. The cell of claim 75, wherein said cell is a primary electric current producing cell.

81. The cell of claim 75, wherein said anode comprises one or more anode-active materials selected from the group consisting of:

lithium metal, lithium-aluminum alloys, lithium-tin alloys, lithium-intercalated carbons, and lithium-intercalated graphites.

82. The cell of claim 75, wherein said cathode comprises one or more cathode active materials selected from the group consisting of:

transition metal chalcogenides, conductive polymers, and sulfur-containing materials.

83. The cell of claim 75, wherein said cathode comprises a sulfur-containing materials.

84. The cell of claim 83, wherein said sulfur-containing material comprises elemental sulfur.

85. The cell of claim 83, wherein said sulfur-containing material comprises a sulfur-containing polymer comprising a covalent polysulfide moiety of the formula, $-S_m-$, wherein m is an integer equal to or greater than 3.

86. The cell of claim 83, wherein said sulfur-containing material comprises a sulfur-containing polymer comprising a covalent polysulfide moiety of the formula, $-S_m-$, wherein m is an integer equal to or greater than 8.

87. The cell of claim 85, wherein said sulfur-containing polymer has a polymer backbone chain comprising conjugated segments.

88. The cell of claim 85, wherein said sulfur-containing polymer has a polymer backbone chain and said polysulfide moiety, $-S_m-$, is covalently bonded by one or both of its terminal sulfur atoms on a side group to said polymer backbone chain.

89. The cell of claim 85, wherein said sulfur-containing polymer has a polymer backbone chain and said polysulfide moiety, —$S_m$—, is incorporated into said polymer backbone chain by covalent bonding of terminal sulfur atoms of said polysulfide moiety.

90. The cell of claim 85, wherein said sulfur-containing polymer comprises greater than 75 weight percent of sulfur.

91. The cell of claim 83, wherein said sulfur-containing material comprises a sulfur-containing polymer comprising an ionic polysulfide moiety selected from the group consisting of:

ionic —$S_m^-$ moieties and ionic $S_m^{2-}$ moieties; wherein m is an integer equal to or greater than 3.

92. The cell of claim 83, wherein said sulfur-containing material comprises a sulfur-containing polymer comprising an ionic polysulfide moiety selected from the group consisting of:

ionic —$S_m^-$ moieties and ionic $S_m^{2-}$ moieties; wherein m is an integer equal to or greater than 8.

93. The cell of claim 91, wherein said sulfur-containing polymer has a polymer backbone chain comprising conjugated segments.

94. The cell of claim 91, wherein said sulfur-containing polymer has a polymer backbone chain and said polysulfide moiety, —$S_m$—, is covalently bonded by one or both of its terminal sulfur atoms on a side group to said polymer backbone chain.

95. The cell of claim 91, wherein said sulfur-containing polymer comprises greater than 75 weight percent of sulfur.

96. The cell of claim 75, wherein said organic electrolyte comprises one or more materials selected from the group consisting of:

liquid electrolytes, gel polymer electrolytes, and solid polymer electrolytes.

97. The cell of claim 75, wherein said organic electrolyte comprises a liquid electrolyte.

98. The cell of claim 75, wherein said organic electrolyte comprises a gel polymer electrolyte.

99. The cell of claim 75, wherein said organic electrolyte comprises a solid polymer electrolyte.

100. A method of forming an electric current producing cell, said method comprising the steps of:

(a) providing an anode;

(b) providing a cathode; and (c) interposing an electrolyte element between said anode and said cathode, wherein said electrolyte element comprises:

(i) a separator comprising a microporous layer comprising pseudo-boehmite and a binder; and (ii) an organic electrolyte contained within pores of said microporous layer.

101. The method of claim 100, wherein the organic electrolyte of said electrolyte element comprises one or more materials selected from the group consisting of:

liquid electrolytes, gel polymer electrolytes, and solid polymer electrolytes.

102. The method of claim 100, further comprising, subsequent to step (c), the step of:

(d) imbibing a solution comprising one or more ionic electrolyte salts and one or more electrolyte solvents into said electrolyte element.

103. The method of claim 101, wherein said organic electrolyte after step (c) and prior to step (d) does not comprise an ionic electrolyte salt.

* * * * *